P. A. BRANGIER.
PROCESS OF MANUFACTURING DRY DIASTATIC YEAST.
APPLICATION FILED FEB. 9, 1910.

986,898.

Patented Mar. 14, 1911.

Witnesses:
Charles Pickles
J. Hashberg

Inventor:
Pierre A. Brangier,
by G. H. Strong.
Attys

UNITED STATES PATENT OFFICE.

PIERRE A. BRANGIER, OF AGNEW, CALIFORNIA.

PROCESS OF MANUFACTURING DRY DIASTATIC YEAST.

986,898.  Specification of Letters Patent.  Patented Mar. 14, 1911.

Application filed February 9, 1910. Serial No. 542,886.

*To all whom it may concern:*

Be it known that I, PIERRE A. BRANGIER, citizen of France, residing at Agnew, in the county of Santa Clara and State of California, have invented new and useful Improvements in Processes of Manufacturing Dry Diastatic Yeast, of which the following is a specification.

My invention relates to the manufacture and preservation of yeast, and pertains especially to a process for manufacturing and drying diastatic yeast.

Compressed yeast, as it is known to the trade, contains when delivered to the consumers from sixty to sixty-five per cent. of water. This state of humidity makes the conservation of the article a very difficult problem, and even an impossible one in hot weather, or in places where there is usually a hot climate. It has been common to add to compressed yeast at the moment it is used for baking, or for similar purposes, some diastatic product which during the various and successive baking operations transforms a certain amount of the starch of the flour into fermentable sugar, thereby giving a ready food to the yeast, which action greatly helps the activities of its cellules. This diastatic product is added, then, at the moment of use, because if added to the moist yeast earlier it would immediately start the germ action, and so would make the yeast of still less easy conservation.

The object of the present invention is to dry up yeast to a point where its conservation is absolutely satisfactory; also to do this without heating the yeast and without altering its fermenting power; and also to add to the yeast at the time of manufacture, rather than at the time of use, a certain amount of malt flour or equivalent, as a diastatic agent and as a ready food on account of the fermentable sugar and other feeding substances for yeast that it contains, and so treating this mixture by a drying process that the result is a dry, self-nourishing and diastatic yeast.

The drawings represent a suitable apparatus for carrying out the process, in which—

Figure 1:
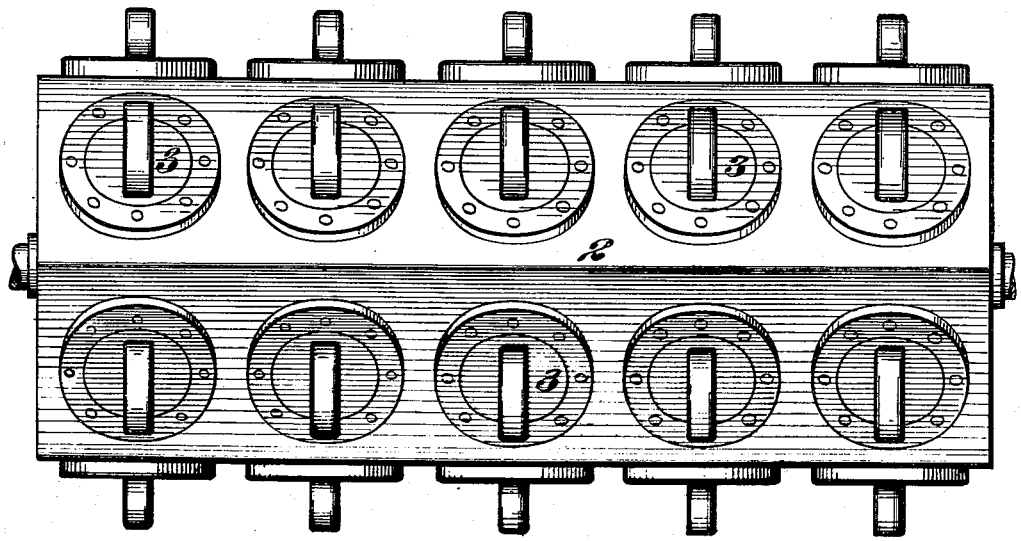
Figure 2:
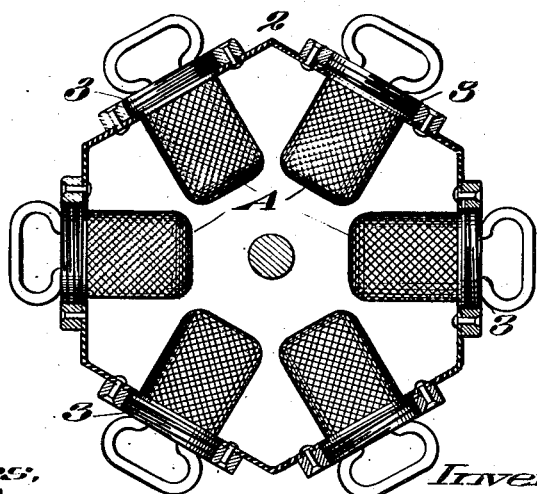

Figure 1 is a plan of the drying cylinder. Fig. 2 is a cross-section of the same.

In carrying out the process the yeast is regularly made as usual, and mixed with a suitable proportion of malt flour, which proportion may be from one to forty per cent., more or less, of the volume of yeast. This mixture is then divided into such small sections as desired; small cubes, or other shapes, preferably pills, of about one-quarter of an inch in diameter. These are then placed in suitable holders or baskets, as A, preferably of wire netting. These holders A fit into flanged holes in a suitable revolving drying cylinder 2, here shown as hexagonal. The holders or baskets A as they are filled are closed by suitable means, as the plugs 3. The cylinder is then partly filled with a certain amount of potato starch previously well-dried and deprived of its water; the charging of the cylinder with the dry starch being done through one or more holes in the cylinder from which the basket or baskets have been omitted, these holes being filled by the plugs 3. The cylinder is then set in slow rotary motion, and the potato starch coming successively in contact with each of the foraminous holders, and by reason of its affinity for water, absorbs from the yeast the water in the same up to a certain point, whereupon the moist or wet starch is removed, and replaced by another batch of well-dried starch, the cylinder again revolved, and so on, until the yeast is dry enough to be of easy conservation. The same potato starch can be used again without practically any loss, the only point being to dry it well before using again.

While I prefer potato starch, manifestly any other suitable absorptive material having a great affinity for water, and which is harmless and preferably such a substance as can be repeatedly re-dried and re-used without deterioration, may be employed. Potato starch meets these requirements because in its regular state it contains from twenty to twenty-three per cent. of water, and if deprived of this water it quickly absorbs it again when put in contact with any wet or moist material.

Any suitable form of drying apparatus may be employed, but I prefer the rotary cylinder and the foraminous containers A for reasons of simplicity and expediency.

Having thus described my invention, what I claim and desire to secure by Letters Patent is—

1. The process of drying yeast-cakes, said process consisting of subjecting the prepared yeast-cake to the contact of the drying agent comprising loose particles having water-absorptive properties.

2. The process of drying an article of yeast liable to injury by heat, said process consisting in subjecting the external surfaces of the article to the contact of a drying agent comprising loose particles having water-absorptive properties.

3. The process of making yeast cakes liable to injury by heat, said process consisting in preparing and shaping the yeast cake into forms, and then subjecting the forms to the action of a dry absorbent in a loose condition.

4. The process of drying yeast cake which consists in subjecting the exterior surfaces of the finished yeast cake to the contact of a dry, healthful, water-absorptive substance of loose character.

5. The process of drying yeast cake which consists in forming the yeast cake into suitable shapes and then drying them by bringing into contact with the exterior surfaces thereof, potato starch or equivalent in a loose condition.

6. The method of making yeast-cakes which consists of mixing malt flour, as food and diastatic agent, with yeast, making the mixture into suitable shapes, and drying the shapes by contact with a healthful, water-absorbent medium, in a dry, loose condition.

7. The method of making a self-nourishing yeast cake, which consists of mixing a self-nourishing and diastatic agent with the yeast, and drying the mass by contact with a dry loose absorbent in the absence of heat and without destroying or changing the fermentation and saccharifying qualities of the moisture.

8. The method of making diastatic and self-nourishing yeast cake which consists in mixing a suitable diastatic agent with the yeast, shaping the mixture into suitable forms, and drying these forms by bringing in contact therewith potato starch in a granular condition.

In testimony whereof I have hereunto set my hand in the presence of two subscribing witnesses.

PIERRE A. BRANGIER.

Witnesses:
CHARLES EDELMAN,
C. C. COOK.